United States Patent
Chen et al.

(10) Patent No.: US 9,195,297 B2
(45) Date of Patent: Nov. 24, 2015

(54) BRIDGING DEVICE FOR CONNECTING TO A HOST EXECUTES A POWER SAVING OPERATION OR A POLLING OPERATION ACCORDING TO STATUS DETECTED BY THE CONNECTION DETECTOR

(71) Applicant: VIA TECHNOLOGIES, INC., New Taipei (TW)

(72) Inventors: Wei-Hung Chen, New Taipei (TW); Hui-Chih Lin, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 338 days.

(21) Appl. No.: 13/677,835

(22) Filed: Nov. 15, 2012

(65) Prior Publication Data
US 2013/0132746 A1 May 23, 2013

(30) Foreign Application Priority Data
Nov. 23, 2011 (TW) .............................. 100142882 A

(51) Int. Cl.
*G06F 1/00* (2006.01)
*G06F 1/32* (2006.01)
*G06F 1/26* (2006.01)

(52) U.S. Cl.
CPC *G06F 1/325* (2013.01); *G06F 1/26* (2013.01); *G06F 1/3203* (2013.01); *G06F 1/3209* (2013.01)

(58) Field of Classification Search
CPC ........ G06F 1/26; G06F 1/3203; G06F 1/3209
See application file for complete search history.

(56) References Cited

U.S. PATENT DOCUMENTS

| | | | |
|---|---|---|---|
| 7,197,578 B1 * | 3/2007 | Jacobs | ............................ 710/14 |
| 8,024,491 B1 * | 9/2011 | Wright et al. | ........ G06F 13/4295 710/16 |
| 8,595,533 B2 | 11/2013 | Lin et al. | |
| 2003/0070103 A1 * | 4/2003 | Kim | .............................. 713/300 |

(Continued)

FOREIGN PATENT DOCUMENTS

| | | |
|---|---|---|
| CN | 102081581 | 6/2011 |
| CN | 102184152 | 9/2011 |

(Continued)

OTHER PUBLICATIONS

English language translation of abstract of JP 200794659 (published Apr. 12, 2007).

(Continued)

*Primary Examiner* — Mohammed Rehman
*Assistant Examiner* — Gayathri Sampath
(74) *Attorney, Agent, or Firm* — McClure, Qualey & Rodack, LLP

(57) ABSTRACT

A bridging device and a power saving method thereof are disclosed. The disclosed bridging device includes a connector, a connection detector and a bridging chip. The connector is operative to connect to a host and includes a power pin and a command pin. The connection detector is coupled to the power pin to determine whether the connector is floating, and, outputs a linked signal when the connection is non-floating. The bridging chip is coupled to the command pin and the connection detector. When the bridging chip receives a power saving command transferred from the host via the command pin and the linked signal transferred from the connection detector, the bridging chip executes a power saving operation.

12 Claims, 3 Drawing Sheets

(56) References Cited

U.S. PATENT DOCUMENTS

| | | | |
|---|---|---|---|
| 2008/0222438 A1* | 9/2008 | Lin et al. | 713/340 |
| 2010/0088454 A1 | 4/2010 | Chang et al. | |
| 2011/0121810 A1* | 5/2011 | Tsai | 323/318 |
| 2012/0126635 A1* | 5/2012 | Yang | 307/126 |

FOREIGN PATENT DOCUMENTS

| | | |
|---|---|---|
| JP | 200794659 | 4/2007 |
| TW | 201015286 | 4/2010 |
| TW | 201044159 | 12/2010 |
| TW | M404409 | 5/2011 |

OTHER PUBLICATIONS

English language translation of abstract of TW 201015286 (pp. 4-5 of publication, published Apr. 16, 2010).

English language translation of abstract of TW 201044159 (p. 2 of publication, published Dec. 16, 2010).

English language translation of TW M404409 (published May 21, 2011).

English language translation of abstract of CN 102081581 (published Jun. 1, 2011).

English language translation of abstract of CN 102184152 (published Sep. 14, 2011).

\* cited by examiner

BRIDGING DEVICE FOR CONNECTING TO A HOST EXECUTES A POWER SAVING OPERATION OR A POLLING OPERATION ACCORDING TO STATUS DETECTED BY THE CONNECTION DETECTOR

CROSS REFERENCE TO RELATED APPLICATIONS

This Application claims priority of Taiwan Patent Application No. 100142882, filed on Nov. 23, 2011, the entirety of which is incorporated by reference herein.

BACKGROUND OF THE INVENTION

1. Field of the Invention

The present invention relates to an electronic device, and in particular relates to power saving operations of a bridging device.

2. Description of the Related Art

Conventionally, a control chip is required between a host and an external peripheral device as a communication bridge, by which data are transferred between the host and the external peripheral device. The control chip may be an on-board chip on a motherboard of the host, or, the control chip may be placed on an add-on card assembled into an expansion slot of the host. For the on-board control chip, when the host is in a power-saving state (i.e., not in the normal operations) or a shutdown state, the on-board control chip still consumes some power. In another case wherein the control chip is deployed on an add-on card, note that no power is consumed by the control chip when the host is in a power-saving state or a shutdown state.

Ideally, when the host enters the power-saving state or the shutdown state, the host should output commands to the external peripheral device via the control chip to drive the external peripheral device to enter a power-saving state or to a shutdown state as well. However, the external peripheral device may fail to receive the commands for power saving or shutting down once the control chip loses its power (e.g. the control chip deployed on an add-on card). Thus, the on-going external peripheral device results in unnecessary waste of power.

BRIEF SUMMARY OF THE INVENTION

A bridging device and a power saving method for a bridging device are disclosed, which may be implemented in an external electric device.

A bridging device in accordance with an exemplary embodiment of the invention comprises a connector, a connection detector and a bridging chip. The connector is arranged for connecting to a host and comprises a power pin and a command pin. The connection detector is coupled to the power pin to determine whether the connector is floating. When the connector is non-floating, the connection detector outputs a linked signal. The bridging chip is coupled to the command pin and the connection detector. When the bridging chip receives a power-saving command transferred from the host through the command pin and the linked signal from the connection detector, the bridging chip executes a power-saving operation.

A power saving method for a bridging device in accordance with an exemplary embodiment of the invention is discussed in this paragraph. According to the disclosed method, a connection detector is provided within the bridging device, and the bridging device is arranged for connecting to a host. By the connection detector, it is determined whether a connector of the bridging device is floating, and generates a linked signal when the connector is non-floating. A bridging chip of the bridging device is utilized to receive the linked signal and to receive a power-saving command from the host and to execute a power-saving operation accordingly.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Typically, a host may have one or more connection ports to connect to external peripheral devices. Every connection port may have its own communication protocol, such as a USB or IEEE1384 communication protocol and so on. When an external peripheral device does not comply with the communication protocol of the connection ports of the host, a bridging device is required as an interface for communication protocol transformation so that data communication between the external peripheral device and the host is achieved. For example, in a case wherein the communication protocol of the connection port of the host is a USB communication interface but the external peripheral device is a SATA HDD (Serial Advanced Technology Attachment Hard Disk Drive), a bridging device is required to provide a communication protocol transformation between the SATA communication interface and the USB communication interface. In this manner, transferring data between the SATA HDD and the host can be accomplished.

Figure 1:
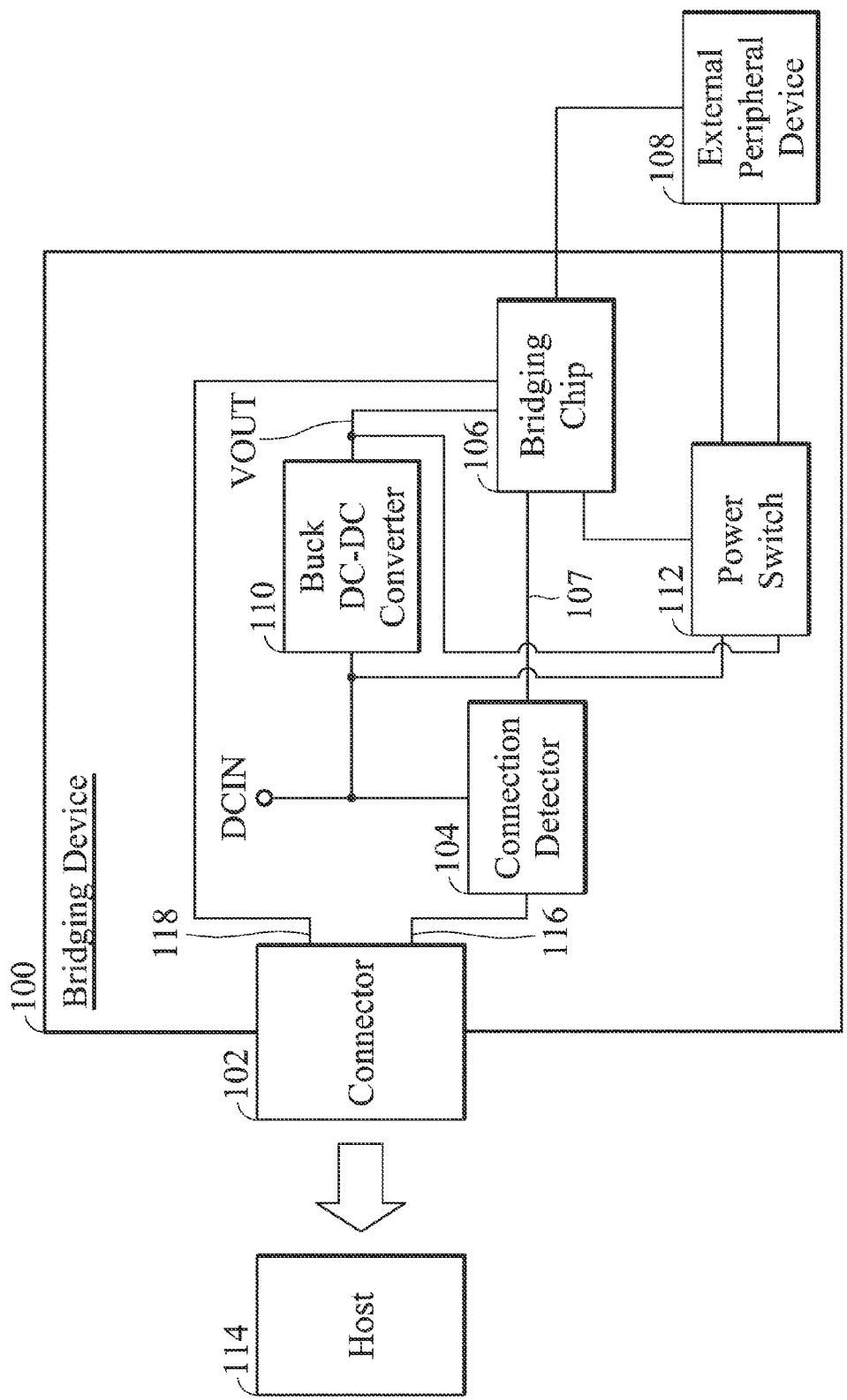
FIG. 1 illustrates a bridging device 100 in accordance with an exemplary embodiment of the invention.

FIG. 1 depicts a bridging device 100 in accordance with an exemplary embodiment of the invention. The bridging device 100 is operative to connect an external peripheral device 108 to a host 114. The bridging device 100 comprises a connector 102, a connection detector 104, a bridging chip 106, a buck dc-dc converter 110 and a power switch 112.

The power supply circuit of the bridging device 100 is discussed in this paragraph. In the exemplary embodiment of FIG. 1, the power supply that powers the bridging device 100 is labeled as DCIN. In addition to supplying power to the connection detector 104, the power supply DCIN is further down converted as a voltage source VOUT by the buck dc-dc converter 110. The voltage source VOUT powers the bridging chip 106 as well as the power switch 112. The bridging chip 106 controls the power switch 112 to choose whether to convey the power supply DCIN and the voltage source VOUT to the external peripheral device 108 to supply power to the external peripheral device 108. For example, in a normal operation state, the bridging chip 106 may switch on the power switch 112 to convey the power supply DCIN and the voltage source VOUT to the external peripheral device 108. When the host 114 or the external peripheral device 108 is in a shutdown or power saving state, the bridging chip 106 may switch off the power switch 112 to reduce the redundant power consumption. Thus, the power consumption in the power saving state or shutdown state is less than that in a normal operation state. The power saving state may be the S1, S2, S3 or S4 state defined by the Advanced Configuration and Power Interface (ACPI), and the shutdown state may be the S5 state defined by the ACPI. The normal operation state may be defined as the S0 state of the ACPI. The operations of the components shown in the figure are detailed below.

As shown in FIG. 1, the connector 102 may be implemented as a communication interface according to a USB protocol, operative to connect to the host 114. The connector 102 has a power pin 116 and a command pin 118. The connection detector 104 is coupled to the power pin 116 of the connector 102 to determine whether the connector 102 is floating. In an exemplary embodiment, the "floating" status describes that the connector 102 is not connected to the host 114. For example, the host 114 and the connector 102 are typically connected through a communication cable (not shown in the figure). Once the communication cable is unplugged (cable-out), the connector 102 is regarded as floating. On the contrary, the connector 102 is regarded as non-floating when the communication cable is coupled between the host 114 and the connector 102. For example, in a case wherein one end of the communication cable is coupled to the connector 102 while the other end is connected to the host 114, the connector 102 is non-floating. In an exemplary embodiment, the connection detector 104 may output an unlinked signal when determining that the connector 102 is floating. When determining that the connector 102 is non-floating, the connection detector 104 may output a linked signal.

The bridging chip 106 is coupled to the command pin 118 of the connector 102 as well as the external peripheral device 108. Thus, via the bridging chip 106, the external peripheral device 108 communicates with the host 114 that the connector 102 connects to. Further, the bridging chip 106 is coupled to the connection detector 104 to receive the linked signal or the unlinked signal output from the connection detector 104.

As described above, the connection detector 104 outputs the linked signal when determining that the connector 102 is non-floating. When receiving a power saving command transferred from the host 114 through the command pin 118 of the connector 102 and receiving the linked signal, the bridging chip 106 executes a power saving operation in accordance with the power saving command, to enter a power saving state. In detail, before the host 114 enters the power saving state, the host 114 sends a power saving command to the bridging chip 106. When the power saving command from the host 114 and the linked signal from the connection detector 104 are received, the bridging chip 106 executes a power saving operation to shut down all firmware of the bridging chip 106 and to shut down the power switch 112 and thereby enters a power saving state, wherein only part of the hardware is in a standby mode, to wait for a resume command from the host 114.

On the contrary, when determining that the connector 102 is floating, the connection detector 104 outputs the unlinked signal. When receiving a power saving command and the unlinked signal, the bridging chip 106 executes a polling operation to enter a polling state. In the polling state, the firmware and the related hardware continuously operate to check the connection state of the connector 102. Because the firmware and the related hardware of the bridging chip 106 are continuously operated (i.e. not in the power saving state) in the polling state, the bridging chip 106 consumes much more power in the polling state than in the power saving state. That is, the power consumption of the bridging chip 106 in the power saving state is less than that of the bridging chip 106 in the polling state. Note that once the bridging chip 106 enters the polling state, the linked signal received later does not switch the bridging chip 106 from the polling state to the power saving state, and the bridging chip 106 is held in the polling state.

Conclusively, in the disclosure, the floating/non-floating state of the connector 102 is considered in the present invention. When the connector 102 is non-floating, the bridging chip 106 executes a power-saving operation to enter a power-saving state according to a power-saving command from the host 114. Note that in conventional techniques the power pin of the connector (e.g., the VBUS pin of a USB connector) is directly connected to the bridging chip (not shown) rather than connected to the disclosed connection detector. In the conventional design, when a power-saving command is received by the bridging chip, the direct connection between the power pin and the bridging chip constrains the bridging chip so that the bridging chip of the conventional design selects between the power-saving state and the polling state according to whether the power pin is energized rather than according to whether the connector is floating or non-floating. Note that when the connector is non-floating but the power pin is not energized, the bridging chip, in the conventional design, is incapable of entering the proper power-saving state according to the received power-saving command and is forcibly switched to the polling state which consumes considerable power. One of the purposes of the disclosure is to solve redundant power consumption. In a case wherein the connector 102 is non-floating but the power pin 116 is not energized, the bridging chip 106 operated according to the disclosure is effectively switched to the power-saving state to consume less power, which is significantly better than the conventional techniques. Furthermore, with environmental protection consciousness, power saving is important in electric device design. The EuP directive (eco-design of energy-using products) provides the energy consumption specification for various operating states of several electronic devices. According to the disclosure, the bridging device enters the power-saving state according to the power-saving command even when the bridging device is non-floating (where the power pin may be energized or not). The bridging device is prevented from entering the polling state erroneously. In this manner, the electronic device complies with the Eup directive.

Figure 2:
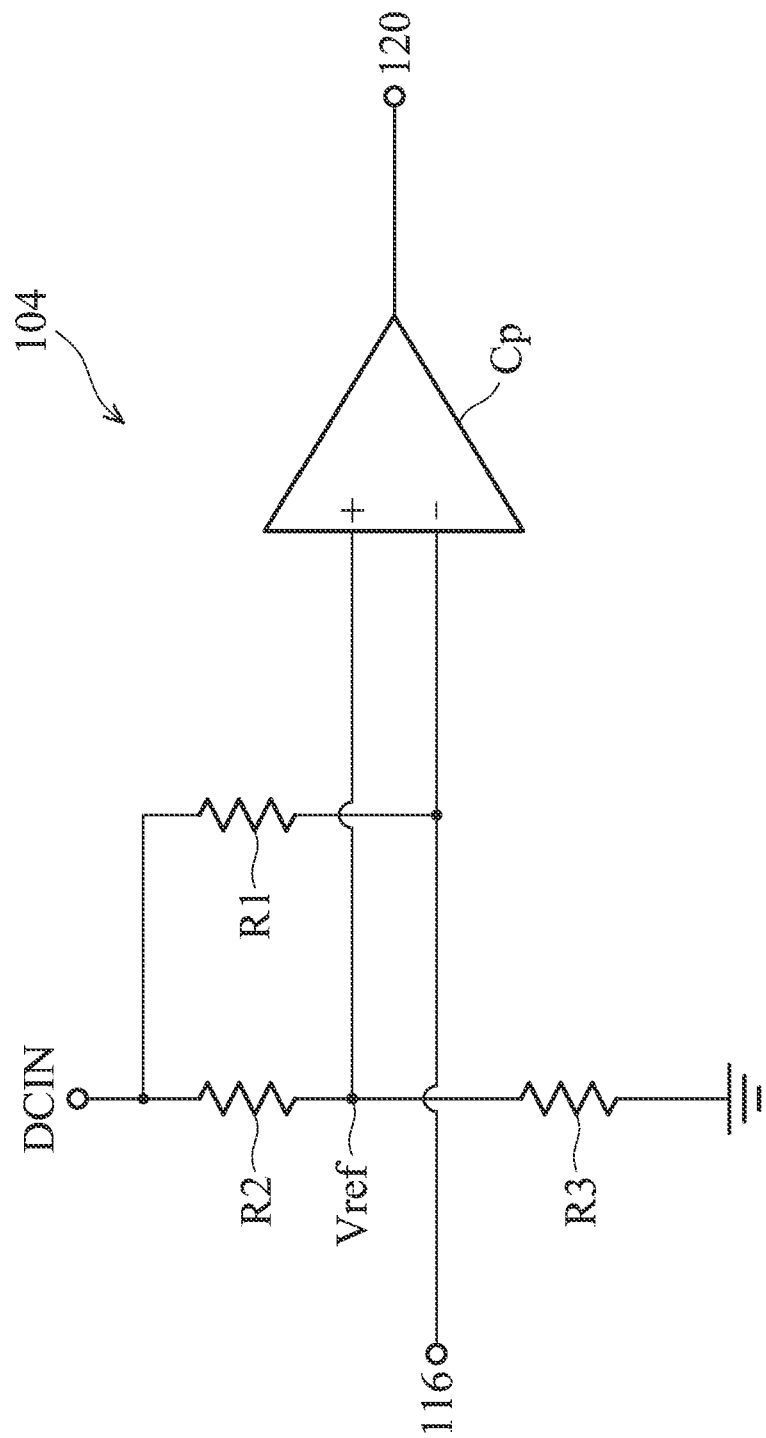
FIG. 2 depicts a connection detector 104 in accordance with an exemplary embodiment of the invention.

FIG. 2 depicts an exemplary embodiment of the connection detector 104. The connection detector 104 comprises a first resistor R1, a comparator Cp, a second resistor R2 and a third resistor R3. In this exemplary embodiment, the second resistor R2 and the third resistor R3 are coupled in series between the voltage source DCN and the ground as a voltage dividing circuit. The connection terminal between the resistors R2 and R3 may provide a reference voltage Vref. By the voltage dividing circuit formed by the second resistor R2 and the third resistor R3, the reference voltage Vref is lower than the voltage provided by the voltage source DCIN. The first resistor R1 is coupled between the power pin 116 of the connector 102 of FIG. 1 and the voltage source DCIN. The comparator Cp has a non-inverting input terminal (labeled '+'), an inverting input terminal (labeled '−') and an output terminal 120. The non-inverting input terminal ('+') may receive the reference voltage Vref. The non-inverting input terminal ('−') is coupled to the power pin 116. The output terminal 120 is coupled to the bridging chip 106 of FIG. 1. In this exemplary embodiment, the relative voltage difference between the non-inverting input terminal ('+') and the inverting input terminal ('−') of the comparator Cp is used in determining whether the connector 102 is floating. And the output terminal 120 outputs a linked signal to present the linked status or an unlinked signal to present the unlinked status of a connector respectively. In this exemplary embodiment, when the voltage level of the non-inverting input terminal ('+') is greater than the voltage level of the inverting input terminal ('−'), the comparator Cp outputs a signal (i.e. the aforementioned linked signal) provided with a first voltage level at the output terminal 120 to indicate the linked status. When the voltage level of the non-inverting input terminal ('+') is lower than the voltage level of the inverting input terminal ('−'), the comparator Cp outputs a signal (i.e. the aforementioned unlinked signal) provided with a second voltage level at the output terminal 120 to indicate the unlinked status. The first voltage level may be greater than the second voltage level. Preferably, the first voltage level is 5 volts and the second voltage level is 0 volt. In another exemplary embodiment, those skilled in the art may modify the internal circuit design of the connection detector 104 according to the actual demand. For example, the linked signal may be output when the voltage level of the non-inverting input terminal ('+') is lower than that at the inverting input terminal ('−') and the unlinked signal may be output when the voltage level of the non-inverting input terminal ('+') is greater than that at the inverting input terminal ('−'.) The exemplary embodiments discussed above are just examples and not intended to limit the scope of the disclosure.

Referring to FIG. 1 and FIG. 2 both, the mechanism of the connection detector 104 for determining whether the connector 102 is floating or non-floating is described below.

When the connector 102 of FIG. 1 is floating (without linking to the host 114 or other devices), the connection detector 104 outputs the unlinked signal to the bridging chip 106. In this paragraph, how the connection detector 104 outputs the unlinked signal in the floating status is described. When the power pin 116 is not coupled to the host 114, the voltage level of the floating power pin 116 may equal to the voltage provided by the power source DCIN. That is, the voltage level of the inverting input terminal ('−') of the comparator Cp equals to the voltage level of the voltage source DCIN. Because the non-inverting input terminal ('+') is coupled to receive the reference voltage Vref and the design of the voltage dividing circuit (formed by the second and the third resistor R2 and R3) forces the reference voltage Vref to be lower than the voltage of the voltage source DCIN, the non-inverting input terminal ('+') is at a voltage (the reference voltage Vref) lower than the voltage (DCIN) at the inverting input terminal ('−') when the connector 102 is floating. In this case, the comparator Cp outputs the unlinked signal at the output terminal 120 when the voltage (Vref) at the non-inverting input terminal ('+') is lower than the voltage (DCIN) at the inverting input terminal ('−'), to indicate the floating status of the connector 102.

Prior to the discussion of how the connection detector 104 of FIG. 2 determines that the connector 102 is non-floating, note that when the connector 102 is coupled to a power-saving operated or shut-down host 114, the power pin 116 of the connector 102 may be not energized. The power pin 116 of the connector 102 is energized or not depending on the configuration type of a control chip (not shown) of the host 114, where the control chip controls the data communication between the host 114 and the external peripheral device 108. For example, in USB applications, the control chip may be an on-board USB control chip or an add-on card USB control chip deployed on an add-on card. The on-board USB control chip is built in the motherboard of the host 114. When the motherboard is in the power-saving or shutdown state, a voltage of 5 volts is coupled to the power pin 116 (e.g. the VBUS pin of a USB connector) of the connector 102 so that the power pin 116 is energized. For an add-on card USB control chip, the USB control chip is coupled to the motherboard of the host 114 through an expansion slot. When the host 114 is in a power-saving state or shutdown state, the add-on card USB control chip loses electrical power. Thus, no power is supplied at the power pin 116 of the connector 102 and the power pin 116 is not energized.

According to the power state of the host, how the connection detector 104 outputs the linked signal when the connector 102 is non-floating and the power pin 116 is energized is described. For the USB applications, the connector 102 is a USB connector and is coupled to the on-board USB control chip of the host 114. As mentioned above, the on-board USB control chip is directly built in the motherboard of the host 114. When the host 114 is in the power-saving or shutdown state, the on-board USB chip may still output 5 volts to the power pin 116 of the connector 102. Thus, voltage level of the power pin 116 of the connector 102 is 5 volt, and the inverting input terminal ('−') of the comparator Cp is at 5 volt. In this exemplary embodiment, for the purpose to output signal from the comparator Cp to indicate the linked status of the connector 102 when the connector 102 is non-floating and the power pin 116 is energized, the voltage level of the non-inverting input terminal ('+') of the comparator Cp has to be greater than that at the voltage level of the inverting input terminal ('−'). The voltage level of the non-inverting input terminal ('+') of the comparator Cp—the reference voltage Vref— depends on the voltage source DCIN, the second resistor R2 and the third resistor R3. Thus the voltage level of the reference voltage Vref may be designed to be greater than the voltage level of the power pin 116 (5 volt) by adjusting the resistance ratio of the second resistor R2 to the third resistor R3. By properly adjusting the resistance ratio, the voltage level of the non-inverting input terminal ('+') of the comparator Cp (the reference voltage Vref) is greater than the voltage level of the inverting input terminal ('−', referring to the voltage level of the power pin 116, 5 volt.) Thus, the output terminal 120 outputs the linked signal to indicate that the connector 102 is non-floating.

In this paragraph, how the connection detector 104 outputs the linked signal when the connector 102 is non-floating but the power pin 116 is not energized is described. For USB applications, the connector 102 is a USB connector and is coupled to the USB port (not shown) of the host 114 via a communication cable (not shown). In a case wherein the control chip (not shown) of the host 114 is an add-on card USB control chip, the add-on card USB control chip is incapable of supplying power to the connector 102 when the host 114 is in the power-saving or shutdown state. Thus, the power pin 116 is not energized. However, note that the coupling between the power pin 116 and the USB port (not shown) of the host 114 may result in an equivalent impedance at the power pin 116 (e.g. the impedance of a current overshoot protection circuit loop at the USB connection port.) The equivalent impedance provided by the connection port may be coupled to the first resistor R1 in series to form a voltage dividing circuit which divides the voltage output from the voltage source DCIN. Thus, the voltage level of the inverting input terminal ('−') depends on the voltage source DCIN, the first resistor R1 and the equivalent impedance of the connection port. In this exemplary embodiment, for the purpose to output signal from the comparator Cp to indicate the linked status of the connector 102 when the connector 102 is non-floating but the power pin 116 is not energized, the voltage level of the non-inverting input terminal ('+') has to be greater than the voltage level of the inverting input terminal ('−'). The voltage level of the inverting input terminal ('−') of the comparator Cp depends on the voltage source DCIN, the first resistor R1 and the equivalent resistance of the connection port. The voltage level of the non-inverting input terminal ('+', reference voltage Vref) could be greater than the voltage level of the inverting input terminal ('−', the voltage provided from the voltage dividing circuit formed by the first resistor R1 and the equivalent impedance of the connection port) by properly choosing the resistance of the first resistor R1. Then output terminal 120 may output the linked signal to indicate that the connector 102 is non-floating.

In conclusion, the connection detector 104 of the disclosure is capable of determining whether the connector 102 is floating or non-floating. When the connector 102 is floating, the connection detector 104 may output an unlinked signal to the bridging chip 106 to show that the connector 102 is floating. When the connector 102 is non-floating, the connection detector 104 may output a linked signal to the bridging chip 106 to show that the connector 102 is non-floating. As stated above, when receiving a power-saving command, the bridging chip in the conventional design is selectively switched to a power-saving state or a polling state based on the power state of the power pin of the connector. When the connector is non-floating (e.g. connected to a host) but the host does not supply power to the connector (the power pin 116 of the connector is not energized), the bridging device of the conventional design is incapable of entering a power-saving state according to the power-saving command. The bridging device is kept running in the polling state which consumes considerable power. In comparison with the conventional techniques, the connection detector 104 of the disclosure may determine whether the connector 102 is floating or non-floating even though the power pin 116 is not energized. When the connection detector 104 determines that the connector 102 is non-floating, still the bridging chip 106 could enter the power-saving state to reduce power consumption even though the power pin 116 is not energized.

Therefore, according to the techniques of FIG. 2, determining whether the connector 102 is floating or non-floating is accomplished. The connection detector 104 may output a linked signal provided with a first voltage level when the connector is non-floating, and may output an unlinked signal provided with a second voltage level when the connector is floating. Note that FIG. 2 just shows an exemplary embodiment of the connection detector 104 of the disclosure. Any device that is coupled to the power pin of the connector and is for recognizing the floating/non-floating status of the connector may be utilized as the connection detector of the disclosure.

In some embodiments, the bridging chip 106 of FIG. 1 is implemented by any general bridging chip available. In the exemplary embodiments, the bridging chip 106 is still coupled to the command pin 118 of the connector 102. A voltage level detection pin 107 of the bridging chip is coupled to the connection detector 104 to receive the linked signal or the unlinked signal (e.g., the signal at the output terminal 120 of the comparator Cp of FIG. 2) output from the connection detector 104. In this manner, the standard bridging chip may operate according to the floating or non-floating status of the connector 102 as well, to save more power during operations.

The bridging chip 100 may be implemented according to a USB, IEEE 1394 or other communication protocols, for communicating with the host 114. The disclosure may be used in any bridging device with a connector having a power pin (e.g. the VBUS pin of a USB connector.)

Figure 3:
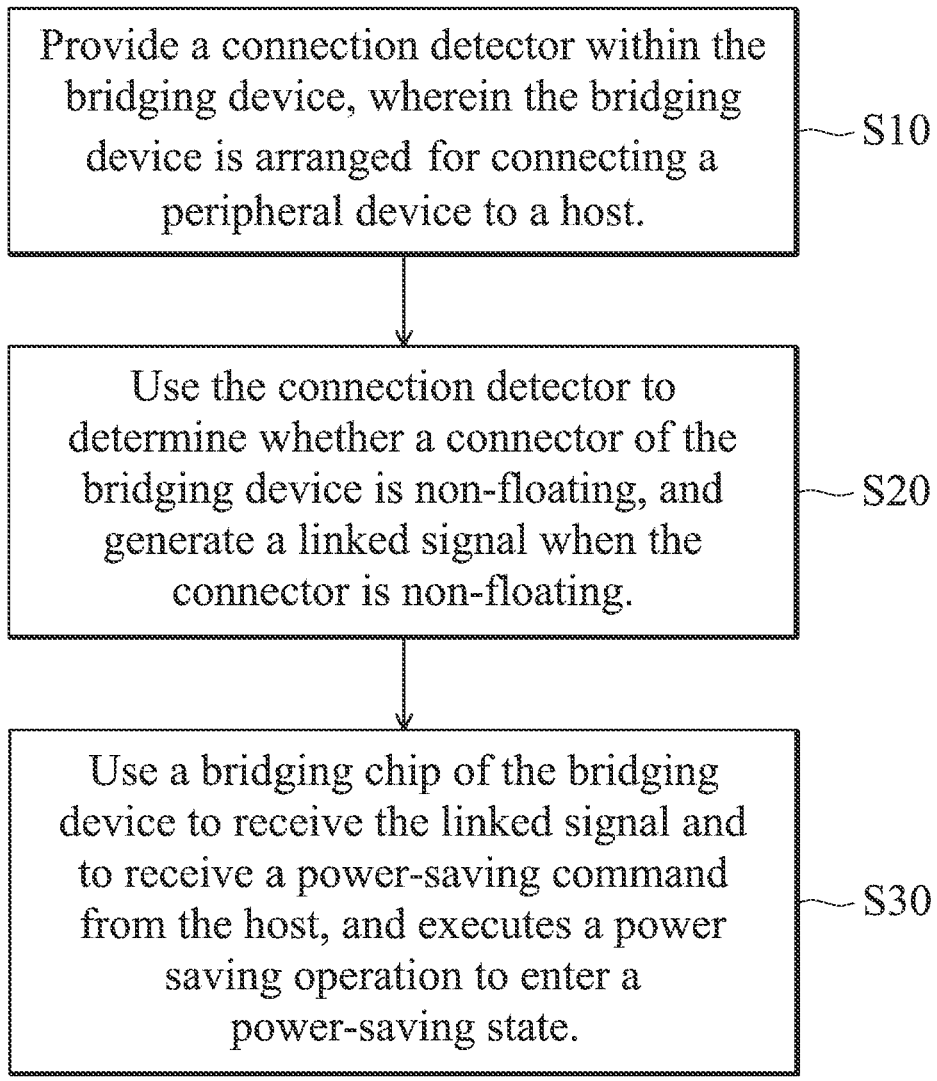
FIG. 3 depicts a power-saving method for a bridging device in accordance with an exemplary embodiment of the invention.

FIG. 3 depicts a power saving method for a bridging device in accordance with an exemplary embodiment of the invention, comprising the steps detailed below.

In step S10, a connection detector is provided within a bridging device. The bridging device is arranged for connecting a peripheral device to a host.

In step S20, the connection detector is operated to determine whether a connector of the bridging device is non-floating. When the connector is non-floating, the connection detector generates a linked signal. When the connector is floating, the connection detector generates an unlinked signal. In the case wherein the connector is non-floating, a power pin of the connector may be energized or not. When the connector is non-floating and the power pin of the connector is not energized, the connection detector still determines that the connector is non-floating and generates the linked signal. In another case, when the power pin of the connector is energized, the connection detector also determines that the connector is non-floating and generates the linked signal. On the contrary, when the connector is floating and the power pin of the connector is not energized, the connection detector determines that the connector is floating and generates an unlinked signal.

In step S30, a bridging chip of the bridging device receives the linked signal and receives a power-saving command from the host, and executes a power saving operation to enter a power-saving state. Note that no matter whether the power pin of the connector is energized or not, the bridging device of the disclosure enters a power-saving state in accordance with the power-saving command from the host when the connector of the bridging device is non-floating. The bridging device consumes less power in the power saving state. In comparison with the conventional bridging devices which are strapped in a polling state (consuming considerable power) and incapable of entering the power saving state when the connector is non-floating but the power pin is not energized, the disclosure successfully solves these problems.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bridging device for connecting to a host, comprising:
   a connector being arranged for connecting to the host, wherein the connector comprises a power pin and a command pin;
   a connection detector, coupled to the power pin to determine whether the connector is floating based on a voltage level at the power pin, wherein the connection detector outputs a linked signal when the connector is non-floating and outputs an unlinked signal when the connector is floating; and
   a bridging chip, coupled to the command pin and the connection detector, wherein:
   when the connector is non-floating, the connection detector outputs the linked signal to the bridging chip even though the host does not supply power to the power pin;
   when receiving a power-saving command from the host via the command pin, the bridging chip executes a power-saving operation or a polling operation according to status of the connector detected by the connection detector;

the bridging chip executes the power-saving operation to enter a power saving state when receiving the power-saving command from the host via the command pin and receiving the linked signal output from the connection detector;

the bridging chip executes the polling operation to enter a polling state when receiving the power-saving command from the host via the command pin and receiving the unlinked signal output from the connection detector; and power consumption of the bridging chip in the power saving state is less than power consumption of the bridging chip in the polling state.

2. The bridging device as claimed in claim 1, wherein the connection detector comprises:

a first resistor, coupled between the power pin and a voltage source; and a comparator, comprising a non-inverting input terminal, an inverting input terminal and an output terminal, wherein the non-inverting input terminal receives a reference voltage, the inverting input terminal is coupled to the power pin and the output terminal is coupled to the bridging chip, and, the comparator determines whether the connector is floating based on a voltage level at the non-inverting input terminal and a voltage level at the inverting input terminal and outputs the linked signal at the output terminal accordingly.

3. The bridging device as claimed in claim 2, wherein:

a voltage output from the voltage source is greater than the reference voltage; and the voltage level at the inverting input terminal is greater than the reference voltage when the connector is floating, and, the voltage at the inverting input terminal is lower than the reference voltage when the connector is non-floating.

4. The bridging device as claimed in claim 2, wherein the connection detector further comprises:

a second resistor and a third resistor, coupled between the voltage source and a ground in series, wherein a connection terminal between the second resistor and the third resistor is coupled to the non-inverting input terminal to provide the non-inverting input terminal with the reference voltage.

5. The bridging device as claimed in claim 1, wherein the connector is coupled to a control chip of the host, and the control chip is an on-board control chip or an add-on card control chip.

6. The bridging device as claimed in claim 5, wherein the add-on card control chip does not supply power to the power pin when the connector is non-floating and the host is in a power-saving state.

7. The bridging device as claimed in claim 1, wherein the bridging chip comprises a voltage level detection pin coupled to the connection detector to receive the linked signal.

8. The bridging device as claimed in claim 1, wherein the connector is floating when the connector is not coupled to the host, and the connector is non-floating when the connector is coupled to the host.

9. The bridging device as claimed in claim 1, wherein the linked signal is provided with a first voltage level and the unlinked signal is provided with a second voltage level, where the first voltage level is greater than the second voltage level.

10. A power-saving method for a bridging device, comprising:

providing a connection detector in the bridging device, wherein the bridging device is arranged for connecting to a host;

using the connection detector to determine whether a connector of the bridging device is non-floating based on a voltage level at a power pin of the connector and generate a linked signal when the connector is non-floating and generating an unlinked signal when the connector is floating; and using a bridging chip of the bridging device to receive the linked signal and the unlinked signal from the connection detector and a power-saving command from the host, wherein:

when the connector is non-floating, the connection detector outputs the linked signal to the bridging chip even though the host does not supply power to the power pin;

when receiving the power-saving command from the host, the bridging chip executes a power-saving operation or a polling operation according to status of the connector detected by the connection detector;

the bridging chip executes the power-saving operation to enter a power saving state when receiving the power-saving command from the host and receiving the linked signal output from the connection detector;

the bridging chip executes the polling operation to enter a polling state when receiving the power-saving command from the host and receiving the unlinked signal output from the connection detector; and power consumption of the bridging chip in the power saving state is less than power consumption of the bridging chip in the polling state.

11. The power-saving method as claimed in claim 10, wherein the bridging device is connected to a control chip of the host via the connector, and the control chip is an on-board control chip or an add-on card control chip.

12. The power-saving method as claimed in claim 11, wherein the add-on card control chip does not supply power to the power pin of the connector when the connector is non-floating and the host is in a power-saving state.

* * * * *